(12) United States Patent
Lin

(10) Patent No.: US 6,254,115 B1
(45) Date of Patent: Jul. 3, 2001

(54) BICYCLE FRONT FORK AND HEAD TUBE MOUNTING ARRANGEMENT

(76) Inventor: Wen-Hwa Lin, No. 812, Chang Shen Rd., Tian San Chun, Wei Pu Hsiang, Taichung Hsien (TW)

( * ) Notice: Subject to any disclaimer, the term of this patent is extended or adjusted under 35 U.S.C. 154(b) by 0 days.

(21) Appl. No.: 09/515,616

(22) Filed: Feb. 29, 2000

(51) Int. Cl.[7] .................................................. B62K 21/18
(52) U.S. Cl. .......................................... 280/279; 411/295
(58) Field of Search .................................. 280/279, 276, 280/280, 274; 411/248, 295; 403/362

(56) References Cited

U.S. PATENT DOCUMENTS

| | | | |
|---|---|---|---|
| 4,436,468 | * | 3/1984 | Ozaki et al. .......................... 411/248 |
| 4,593,924 | * | 6/1986 | Cabeza .................................. 280/279 |
| 5,085,063 | * | 2/1992 | Van Dyke et al. ..................... 70/218 |
| 5,385,360 | * | 1/1995 | Shook ................................... 280/279 |
| 5,540,457 | * | 7/1996 | Johnson ................................ 280/279 |

* cited by examiner

Primary Examiner—Paul N. Dickson
Assistant Examiner—Avraham H. Lerner
(74) Attorney, Agent, or Firm—Varndell & Varndell, PLLC

(57) ABSTRACT

A bicycle front fork and head tube mounting arrangement includes a front fork having a tubular top shaft and an annular bearing portion around the top shaft, a head tube sleeved onto the top shaft of the front fork and supported on a ball bearing in the annular bearing portion of the front fork, a locating ring supported on a ball bearing in the top end of the head tube around the top shaft of the front fork, a split screw cap tightened up with a locating screw and threaded into an inner thread in the locating ring, a ruuber ring mounted in an inside annular groove in the split screw cap and disposed in close contact with the periphery of the top shaft of the front fork, and a tightening up screw threaded into a radial screw hole on the locating ring to hold down the split screw cap.

3 Claims, 4 Drawing Sheets

BICYCLE FRONT FORK AND HEAD TUBE MOUNTING ARRANGEMENT

BACKGROUND AND SUMMARY OF THE INVENTION

The present invention relates to bicycle, and more specifically to a bicycle front fork and head tube mounting arrangement, which saves much bicycle manufacturing cost, and improves bicycle fabrication efficiency.

Nowadays, more and more people like to ride a bicycle. A bicycle is not only a personal transportation vehicle but also a sports means for physical exercise. In a bicycle, the head tube is supported on a ball bearing at the front fork, and a headlock ring assembly is installed in the top end of the head tube to lock the head tube, enabling the front fork to be rotated in the head tube. The head lock ring assembly is generally comprised of a top shell a bottom shell, a ball bearing cup, steel balls, etc. This structure of headlock ring assembly is complicated. The installation procedure of the head lock ring assembly is also complicated. During installation, the steel balls must be respectively mounted in the ball bearing cup and arranged in good order. Further, the dimentional tolerance of the parts of the headlock ring assembly is critical. If the parts do not fit one another perfectly, the parts must be separately ground to the desired fitness by labor.

The present invention has been accomplished to provide a bicycle front fork and head tube mounting arrangement, which eliminates the aforesaid drawbacks. According to one aspect of the present invention, the bicycle front fork and head tube mounting arrangement comprises a front fork having a tubular top shaft and an annular bearing portion around the top shaft, a head tube sleeved onto the top shaft of the front fork and supported on a ball bearing in the annular bearing portion of the front fork, a locating ring supported on a ball bearing in the top end of the head tube around the top shaft of the front fork, a split screw cap tightened up with a locating screw and threaded into an inner thread in the locating ring, a rubber ring mounted in an inside annular groove in the split screw cap and disposed in close contact with the periphery of the top shaft of the front fork, and a tightening up screw threaded into a radial screw hole on the locating ring to hold down the split screw cap. According to another aspect of the present invention, the annular bearing portion of the front fork has a cross section curved inwards for positive of the front fork has a cross section curved inwards for positive positioning of the corresponding ball bearing.

DETAILED DESCRIPTION OF THE PREFERRED EMBODIMENT

Figure 1:
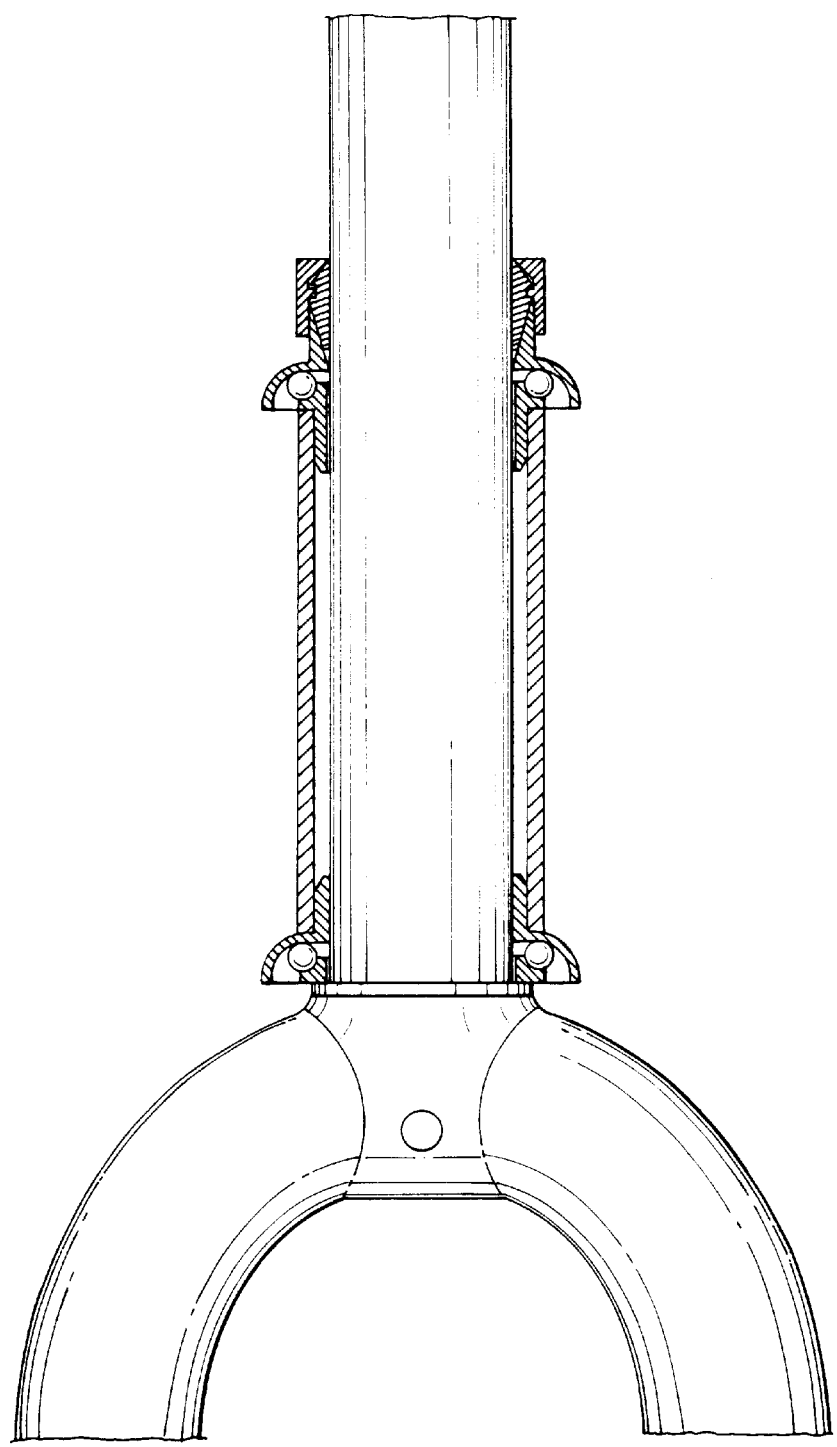
FIG. 1 is a sectional view showing a bicycle head tube and front fork mounting arrangement according to the prior art.
Figure 2:
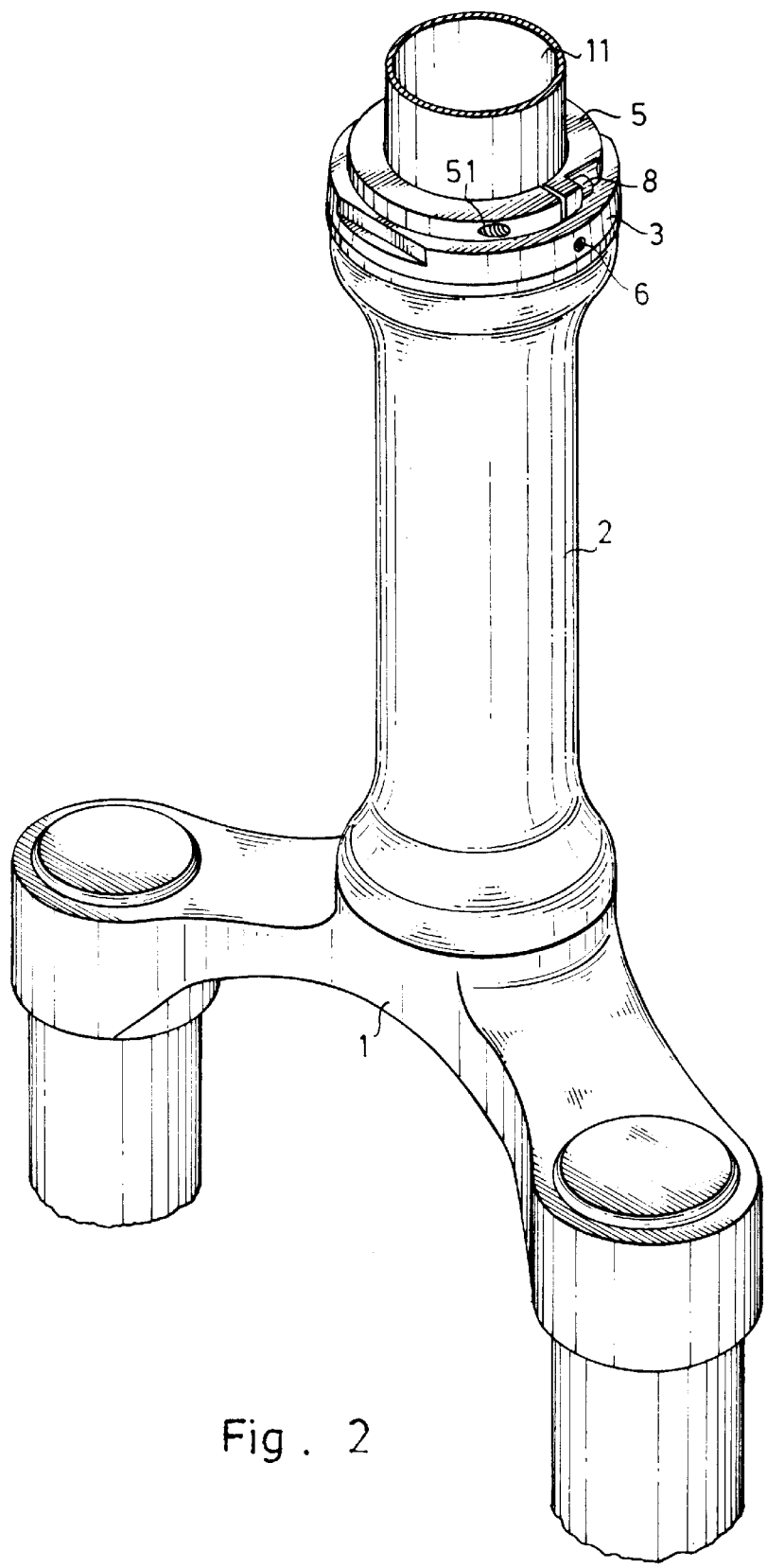
FIG. 2 is an elevational view of a bicycle front fork and head tube mounting arrangement according to the present invention.
Figure 3:
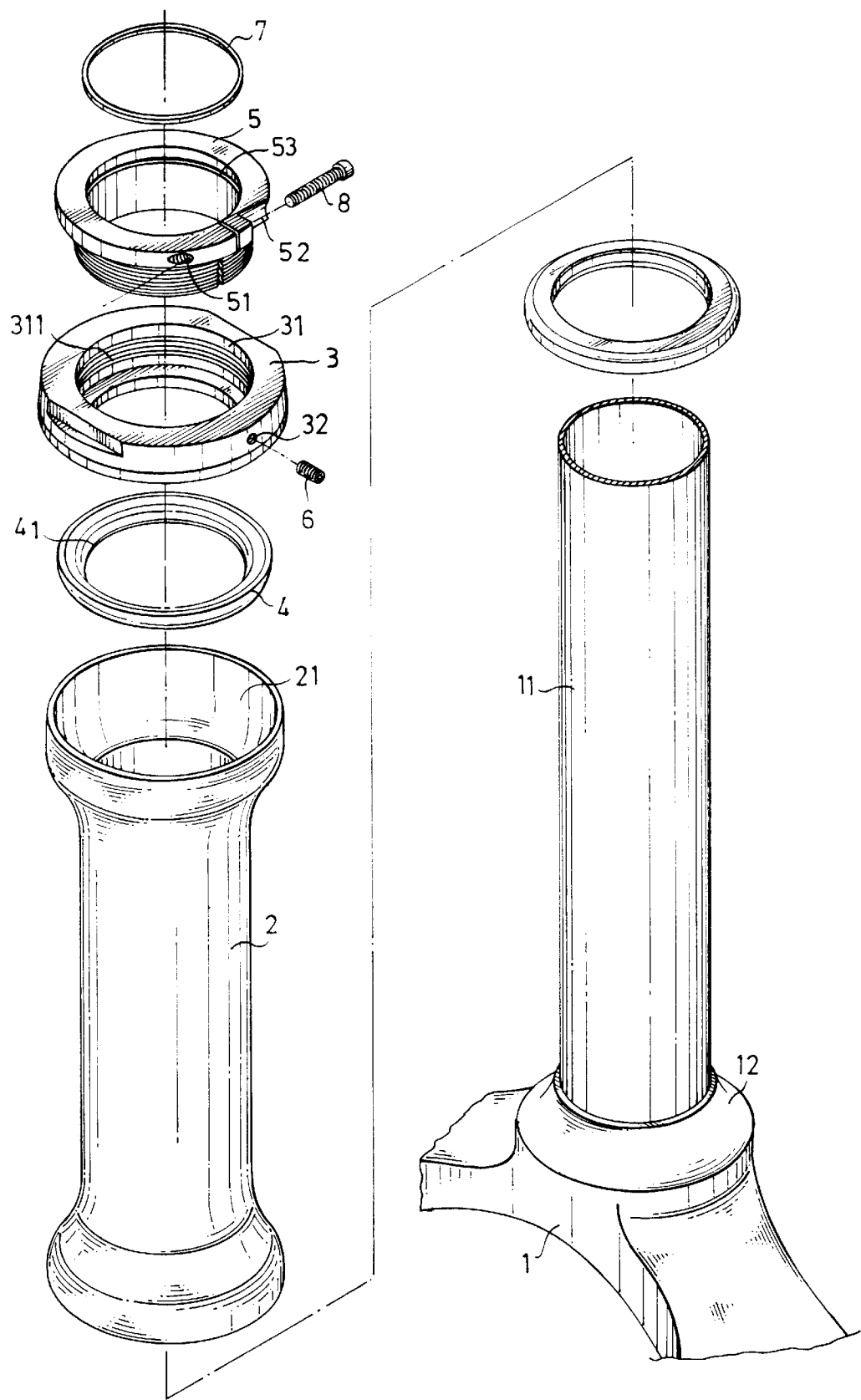
FIG. 3 is an exploded view of the bicycle front fork and head tube mounting arrangement shown in FIG. 2.
Figure 4:
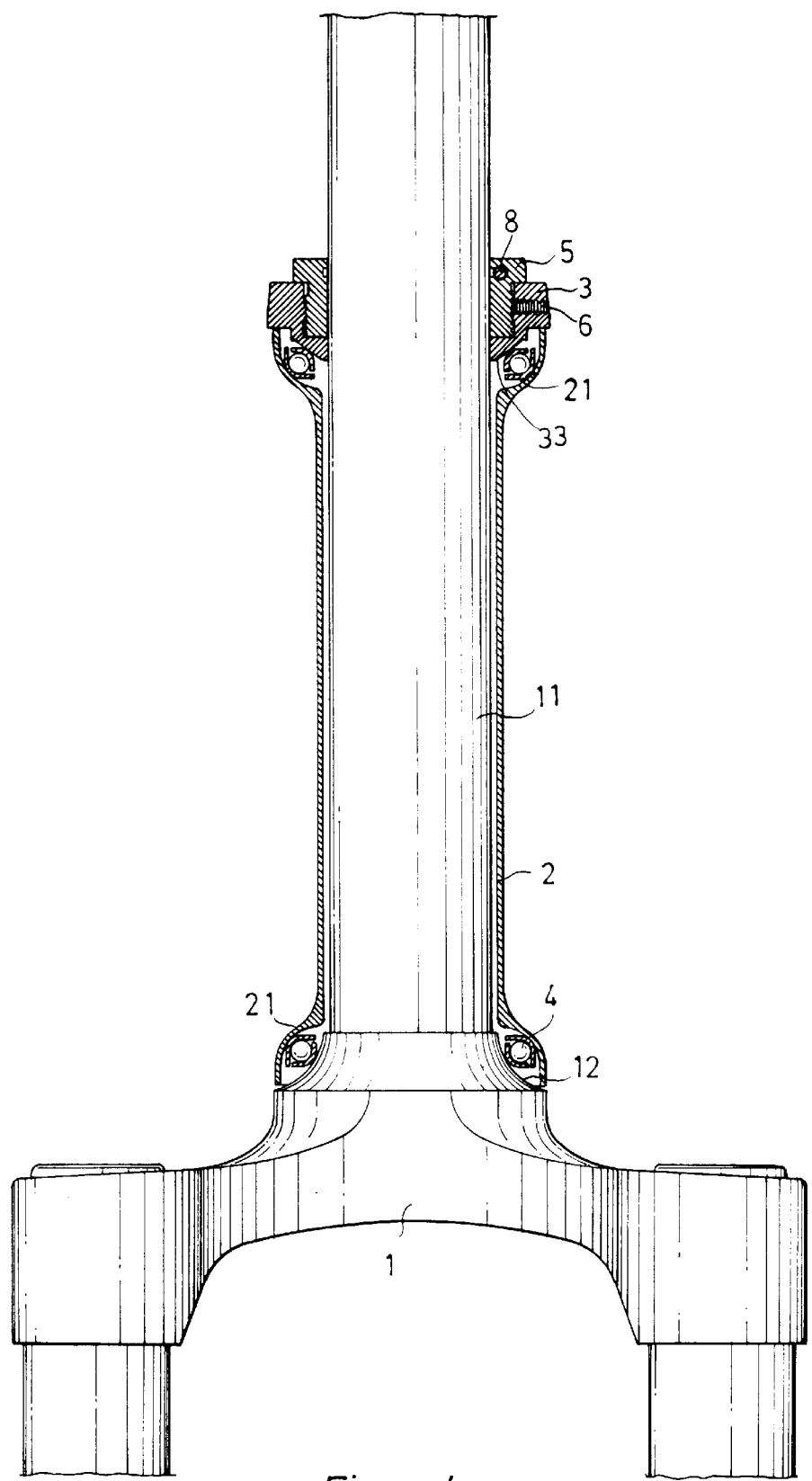
FIG. 4 is a sectional view of the bicycle front fork and head tube mounting arrangement shown in FIG. 2.

Referring to FIGS. 2 through 4, a bicycle front fork and head tube mounting arrangement in accordance with the present invention is generally comprised of a front fork 1, a head tube 2, a locating ring 3, two ball bearings 4, a screw cap 5, a tightening-up screw 6, a rubber ring 7, and a locating screw 8.

The front fork 1 comprises a tubular top shaft 11, and an annular bearing portion 12 disposed around the bottom end of the tubular top shaft 11 for holding one ball bearing 4. The annular bearing portion 12 has a cross section curved inwards. The head tube 2 is sleeved onto the tubular top shaft 11 and supported on the ball bearing 4 at the bearing portion 12 of the front fork 1, comprising two cup-like end flanges 21 at two distal ends thereof for holding the ball bearings 4 respectively. The locating ring 3 comprises an axially extended, stepped center through hole 31, a radial screw hole 32 disposed in communication with the stepped center through hole 31, an inner thread 311 around the center through hole 31, and a tapered bottom positioning portion 33. The ball bearings 4 are respectively mounted in the cup-like end flanges 21 of the head tube 2 around the tubular top shaft 11 of the front fork 1 for enabling the front fork 1 to be rotated in the head tube 2. The screw cap 5 is a split cap threaded into the inner thread 311 of the locating ring 3 around the tubular to shaft 11 of the front fork 1, comprising a transverse screw hole 51 across the split thereof into which the locating screw 8 is threaded to hold the screw cap 5 in a tight manner, a peripheral notch 52 at one end of the transverse screw hole 51, and an inside annular groove 53, which receives the rubber ring 7.

The installation of the present invention is outlined hereinafter. One ball bearing 4 is mounted on the bearing portion 12 around the bottom end of the tubular to shaft 11, and then the head tube 2 is sleeved onto the tubular top shaft 11 of the front fork 1, enabling the cup-like end flange 21 at the bottom end of the head tube 2 to be supported on the ball bearing 4 at the bearing portion 12 of the front fork 1, and then the other ball bearing 4 is mounted in the cup-like end flange 21 at the top end of the head tube 2, and then the locating ring 3 is mounted on the cup-like end flange 21 at the top end of the head tube 2, enabling the tapered bottom positioning portion 33 to be positioned in the inner diameter 41 of the ball bearing 4 at the top end of the head tube 2, and then the rubber ring 7 is mounted in the inside annular groove 53, and then the screw cap 5 is threaded into the inner thread 311 in the locating ring 3 around the tubular to shaft 11, and then the tightening-up screw 6 is threaded into the screw hole 32 on the locating ring 3 to secure the locating ring 3 and the screw cap 5 together. Further, before threading the screw cap 5 into the locating ring 3, the locating screw 8 is rotated to adjust the tightness of the screw cap 5.

What is claimed is:

1. A bicycle front fork and head tube mounting arrangement comprising:
    a front fork having a tubular top shaft and an annular bearing portion disposed around a bottom end of said tubular top shaft, said annular bearing portion having a cross section curved inwards;
    a first ball bearing mounted on said annulur bearing portion of said front fork around said tubular top shaft;
    a head tube mounted around said tubular top shaft of said front fork and support on said annular bearing portion of said front fork, said head tube comprising a first cup-like end flange extended from a bottom end thereof and supported on said first ball bearing at said annular bearing portion of said front fork, and a second cup-like end flange extended from a top end thereof;
    a second ball bearing mounted in said second cup-like end flange of said head tube around said tubular top shaft of said front fork;

a locating ring supported on said second ball bearing, said locating ring comprising an axially extended, stepped center through hole, an inner thread around said center through hole, and a tapered bottom positioning portion positioned in an inner diameter of said second ball bearing; and a split screw cap threaded into the inner thread of said locating ring around said tubular top shaft of said front fork, said split screw cap comprising a transverse screw hole across a split thereof, and an inside annular groove around an inside wall thereof;

a locating screw threaded into the transverse screw hole on said split screw cap to close the split of said split screw cap; and a rubber ring mounted in the inside annular groove and disposed in contact with the periphery of said tubular top shaft of said front fork.

2. The bicycle front fork and head tube mounting arrangement of claim 1 wherein said locating ring comprises a radially extended screw hole, and a tightening-up screw threaded into said radially extended screw hole and stopped against said split screw cap to fix said split screw cap and said locating ring together.

3. The bicycle front fork and head tube mounting arrangement of claim 1 wherein said split screw cap comprises a peripheral notch at one end of the transverse screw hole thereof.

\* \* \* \* \*